(12) United States Patent
Choi

(10) Patent No.: US 10,558,041 B2
(45) Date of Patent: Feb. 11, 2020

(54) VIRTUAL REALITY IMAGE SYSTEM WITH HIGH DEFINITION

(71) Applicant: Hae-Yong Choi, Seoul (KR)

(72) Inventor: Hae-Yong Choi, Seoul (KR)

( * ) Notice: Subject to any disclaimer, the term of this patent is extended or adjusted under 35 U.S.C. 154(b) by 0 days.

(21) Appl. No.: 16/398,326

(22) Filed: Apr. 30, 2019

(65) Prior Publication Data

US 2019/0258060 A1 Aug. 22, 2019

Related U.S. Application Data

(62) Division of application No. 16/156,185, filed on Oct. 10, 2018.

(30) Foreign Application Priority Data

Nov. 13, 2017 (KR) .......................... 10-2017-0150294
Aug. 14, 2018 (KR) .......................... 10-2018-0094729

(51) Int. Cl.

| G02B 27/01 | (2006.01) |
|---|---|
| G02B 27/02 | (2006.01) |
| G06F 3/01 | (2006.01) |
| H04N 13/307 | (2018.01) |
| H04N 13/346 | (2018.01) |

(52) U.S. Cl.
CPC ....... *G02B 27/0149* (2013.01); *G02B 27/022* (2013.01); *G06F 3/013* (2013.01); *H04N 13/307* (2018.05); *H04N 13/346* (2018.05)

(58) Field of Classification Search
CPC ................................. G02B 27/0189; G02B 27/10; G02B 27/2207; G02B 27/22; G02B 27/2228; G02B 27/2235; G02B 27/2242; G02B 27/225; G02B 2027/0198

See application file for complete search history.

(56) References Cited

U.S. PATENT DOCUMENTS

| 756,692 | A | * | 4/1904 | Pappenhagen | ..... G02B 27/2228 359/477 |
|---|---|---|---|---|---|
| 4,730,898 | A | * | 3/1988 | Curtin | ................ G02B 27/2242 359/466 |
| 5,058,990 | A | * | 10/1991 | Bush | .................. G02B 27/2257 359/474 |
| 5,381,266 | A | * | 1/1995 | Mizukawa | ......... G02B 27/2228 359/466 |

(Continued)

FOREIGN PATENT DOCUMENTS

KR 10-1693082 A 9/2015

*Primary Examiner* — Robert E. Tallman
(74) *Attorney, Agent, or Firm* — Bacon & Thomas, PLLC

(57) ABSTRACT

A virtual reality stereoscopic image expansion device with high definition where 1 to 2 monitors are provided in an independent rotary case, first or first and second left and right reflectors having reflective refraction angles of 90° in left and right directions of stereoscopic left and right eye images are provided and configured as left and right lenses for matching optical axes so that the image center of the large monitor having a screen size of a human pupil interval or more is matched with the interval between the left and right eyes of the observer by coupling the optical axes of the monitors and the reflectors with an optical structure. Thereby it makes it possible to observe the stereoscopic image by a general monitor without structures of the polarizer and the translucent mirror.

2 Claims, 6 Drawing Sheets

(56) References Cited

U.S. PATENT DOCUMENTS

| | | | |
|---|---|---|---|
| 7,298,393 B2* | 11/2007 | Morita | H04N 13/239 |
| | | | 348/51 |
| 9,618,764 B2 | 4/2017 | Choi | |
| 2015/0261005 A1* | 9/2015 | Choi | G02B 27/26 |
| | | | 353/8 |

* cited by examiner

VIRTUAL REALITY IMAGE SYSTEM WITH HIGH DEFINITION

CROSS-REFERENCE TO RELATED APPLICATION

This application is a divisional application of U.S. application Ser. No. 16/156,185, filed Oct. 10, 2018, which claims priority to Korean Patent Application No. 10-2017-0150294, filed on Nov. 13, 2017, and Korean Patent Application No. 10-2018-0094729, filed on Aug. 14, 2018 in the Korean Intellectual Property Office, which are hereby incorporated by reference in their entirety.

BACKGROUND OF THE INVENTION

(a) Technical Field

The present invention relates to a virtual reality image system in which a viewer can observe an image in a corresponding rotational viewing direction at the time of observing a virtual reality image while rotating in up, down, left, and right directions.

Particularly, the present invention is characterized by improving and developing a structure of a rotary box in a structure of a 'glassless virtual reality observation device' in U.S. Pat. No. 9,618,764 and Korean Patent Registration No. 10-1693082 which are filed and registered by the present applicant to observe 2D and 3D stereoscopic images in a general monitor, in which brightness and resolution are 8 times or more, a screen size may be configured up to 230 times compared to an existing head-mounted display (HDM), and the overall structure may be rotated by one system.

(b) Background Art

Virtual reality stereoscopic images require different functions from simple stereoscopic image observation devices. The image is provided in a viewing angle range of 120° to 360° in left and right directions and 90° to 360° in up and down directions and rotates and moves in a small range of 60° to 120° in left and right directions and 30° to 60° in up and down directions which are some viewing angles to provide a viewing angle at the corresponding angle, so that it aims at observation of virtual reality images as if being in the field.

Conventionally, in order to observe a virtual reality stereoscopic image, there is a need of a technology of polarizing a left eye image and a right eye image to combine the two image in one frame and separating the combined image into left and right eye images again to view the left and right eye images separately with left and right eyes of the viewer, respectively.

That is, the technology disclosed in U.S. Pat. No. 9,618,764 and Korean Patent Registration No. 10-1693082 filed by the present applicant is a structure which has a polarizing plate on the surface of a monitor image to polarize the images and then has a translucent mirror disposed at the center of each monitor to separate the images and observe the separated images with polarizing glasses or the like again.

Such a stereoscopic apparatus should use a polarizing plate, a translucent mirror, and stereoscopic glasses as well known. However, the maximum transmittance of the polarizing plate is 30° to 50%, and the reflectance and transmittance of the translucent mirror for separating images are 30° to 50%, respectively.

Therefore, since 30° to 50% is transmitted at the polarizing plate, 30° to 50% is transmitted at the translucent light again, and 30° to 50% is transmitted at the polarizing glasses again, a total brightness is rapidly decreased to 2.7% to 12.5%, that is, $\frac{1}{40}$ to $\frac{1}{8}$ or more to see a very cloudy image.

When a screen of one of other 3D image systems, a shutter type, transmits the left and right images in sequence, the brightness is decreased to 50%, the transmittance in shutter glasses is decreased to 15% to 2%, and thus the transmittance is rapidly decreased to a total of 7.5% to 1%.

As a result, the brightness and resolution of a 3D image device and a 3D monitor in the related art are rapidly reduced to $\frac{1}{8}$ to maximum $\frac{1}{100}$ as compared with the 2D image.

In addition, an observation device for viewing a virtual reality stereoscopic image such as a conventional head mount display (HMD) has a limitation on the image size.

That is, an interval between the left and right eyes of human is based on an average of 65 mm.

The stereoscopic image is sensed by simultaneously observing a difference between the left and right views given by the left eye image viewed by the left eye and the right eye image viewed by the right eye.

Therefore, only when the centers of the left eye image and the right eye image, that is, optical axes coincide with each other, the left and right eye images are recognized as one image.

To satisfy these conditions, a horizontal length of the screen size is limited to a small screen of 65 mm×65 mm at left and right.

In other words, since two 65 mm screens are combined and viewed into one, one stereoscopic screen having a 65 mm size is viewed on a 130 mm screen.

However, in the case of the virtual reality image, due to the characteristic of the image, the larger the size of the stereoscopic image, the greater the sense of reality. Thus, a screen size of 100 mm or more, that is, an available large screen is required.

Also, even if the screen is enlarged, the screen can not be rotated for each separated unit, so the screen could not be used as a virtual reality image structure.

For the above reasons, the existing virtual reality image structure has a limitation in use because the brightness is very dark or the size of the screen is small to act as a major cause in which the related industries are not developed.

SUMMARY OF THE DISCLOSURE

It is impossible to observe stereoscopic images by using a general 2D monitor alone.

Even when two stereoscopic left and right eye images are used, it is impossible to observe stereoscopic images because a pupil spacing of human, that is, the horizontal size of 65 mm or more of the screen, can not be matched with an interval between eyes of the human.

The present invention relates to a virtual reality stereoscopic image expansion device with high definition and proposes a method of providing a virtual reality image with high definition configured as one rotating unit by enlarging a brightness to 8 times or more than the related art and a screen size to 4 times or more than a pupil spacing of human and correcting chromatic aberration and distortion of the image.

In the present invention, left and right observation holes provided with left and right lenses are provided on a front surface of the rotary box, a left monitor disposed on the left side of the left and right sides of the inside of the rotary box based on the positions of the left and right observation holes, and a right monitor is provided on the right side thereof, and the screens of the left and right monitors are provided so as to face each other.

A position sensor such as a gyro sensor is provided on the opposite side of the left and right observation holes, that is, the rear surface inside the rotary box.

Left and right reflectors are provided in a bidirectional rectangular shape at positions where optical axes which are centers of the images of the left and right monitors and optical axes which are central axes of the left and right observation holes are perpendicularly matched with each other so that the images of the left and right monitors are reflected in the left and right ocular lenses direction.

As another method, the left and right monitors are provided on the front side in the rotary box in which the left and right observation holes of the rotary box face each other in the form of a left and right straight direction, a position sensor is provided at the positions of the left and right monitors, first left and right reflectors having 45° squares in left and right directions are provided between the front end inside the rotary box and the rear end of the left and right monitors, and second left and right reflectors having 45° squares are provided at positions where the central axes of the first left and right reflectors are matched with the centers of the left and right monitors.

As yet another method, one monitor dividing the image into two at left and right and a position sensor such as a gyro sensor are configured on the front sides of the left and right observation holes inside the rotary box.

The left and right ocular lenses constituted by a composite of the lenses with corrected chromatic aberration and distortion are provided at the left and right observation holes, but are configured by a low-magnification lens for matching the optical axes having a focal distance of 100 mm or more to less than 1000 mm to implement a large screen with high resolution by matching left and right optical axes without reduction of resolution of the monitor.

Further, in the configuration of the left and right ocular lenses, an inner surface of a lens surface which is a human pupil position direction is formed in a − concave shape, an outer surface of the lens surface is formed in a + convex shape, and a sum of focal lengths of the inner and outer surfaces of the lens has a positive force, thereby reducing distortion and observing images with high definition.

Two glasswares having different refractive indexes are synthesized by one lens to be configured as one ocular lens with significantly reduced chromatic aberration, thereby reducing dizziness caused by rotating virtual reality images and providing high-definition images.

As another method, a position sensor such as a gyro sensor is coupled to a monitor in which the internal structure of the rotary box is divided into left and right, and the left and right ocular lenses are provided with the left and right observation holes.

According to the present invention, the optical structure constituting the 3D stereoscopic image to be observed in the general monitor is constituted by one rotary box and the entire optical structure may be rotated by one rotary box.

Also, it is possible to observe the combined stereoscopic image in the general 2D monitor by configuring the refraction and the reflection distances of the first, or first and second left and right reflectors on the same optical axis within the focal distances of the left and right ocular lenses.

In addition, the first left and right reflectors, the second left and right reflectors and one or two general monitors in one rotary box are coupled to the inside of one case to view a 3D image through an optical configuration using only a total reflection reflector and an optical axis ocular lens without using a translucent mirror, a polarizer, polarizing glasses, or shutter glasses as an element inhibiting brightness of 1/8 or more to 1/100, thereby providing brightness of 8 times or more to 100 times and high definition as compared with a conventional 3D image.

The distance between the left and right ocular lenses and the first and second left and right reflectors is extended or the distance between the first left and right reflectors and the second left and right reflectors is extended on the same optical axis to be matched with the optical axes of the left and right images of the monitor, so that the large screen having an area size of 130 mm to 1000 mm as compared with a size having a horizontal length of 65 mm of the conventional screen is configured, thereby providing a large screen of 4 times to 230 times is provided, and particularly, providing this virtual reality image inside the rotary box as one rotation unit.

In addition, the left and right eye images for the virtual reality stereoscopic images are automatically separated in both directions by using the total reflection mirror in one frame, so that the left and right images are separated without a separate electronic device.

Further, since the surface configuration of the ocular lens is formed into a concave spherical surface having a curved surface such as a human pupil, and the rear surface is configured in a convex spherical shape, a shape of the lens is formed in a spherical shape having the same curvature as that of a human pupil, thereby reducing a distortion phenomenon and the dizziness phenomenon of the large image.

Two glasswares having different refractive indexes are combined with one lens to be configured as the ocular lens with significantly reduced chromatic aberration, thereby observing a high-definition virtual reality image by removing the color blurring and chromatic aberration of the lens. In addition, the lenses are doubly configured by the ocular lens and the objective lens to be combined with a reflector or a right angle prism, thereby viewing a remote image with a near-field image effect.

The left and right ocular lenses constituted by a composite of the lenses with corrected chromatic aberration and distortion are provided at the left and right observation holes, but are configured by a low-magnification lens for matching the optical axes having a focal distance of 100 mm or more to less than 1000 mm to implement a large screen with high resolution by matching left and right optical axes without reduction of resolution of the monitor.

Further, in the configuration of the left and right ocular lenses, an inner surface of a lens surface which is a human pupil position direction is formed in a − concave shape, an outer surface of the lens surface is formed in a + convex shape, and a sum of focal lengths of the inner and outer surfaces of the lens has a positive force, thereby reducing distortion and observing images with high definition.

Two glasswares having different refractive indexes are synthesized by one lens to be configured as one ocular lens with significantly reduced chromatic aberration, thereby reducing dizziness caused by rotating virtual reality images and providing high-definition images.

The entire optical system including the left and right ocular lenses, the left and right monitors, the first or second left and right divided reflectors, and the like is provided in one box, so that the entire system may rotate up, down, left, and right on the same optical axis structure line by one rotary box unit.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

DETAILED DESCRIPTION OF THE INVENTION

Figure 1:
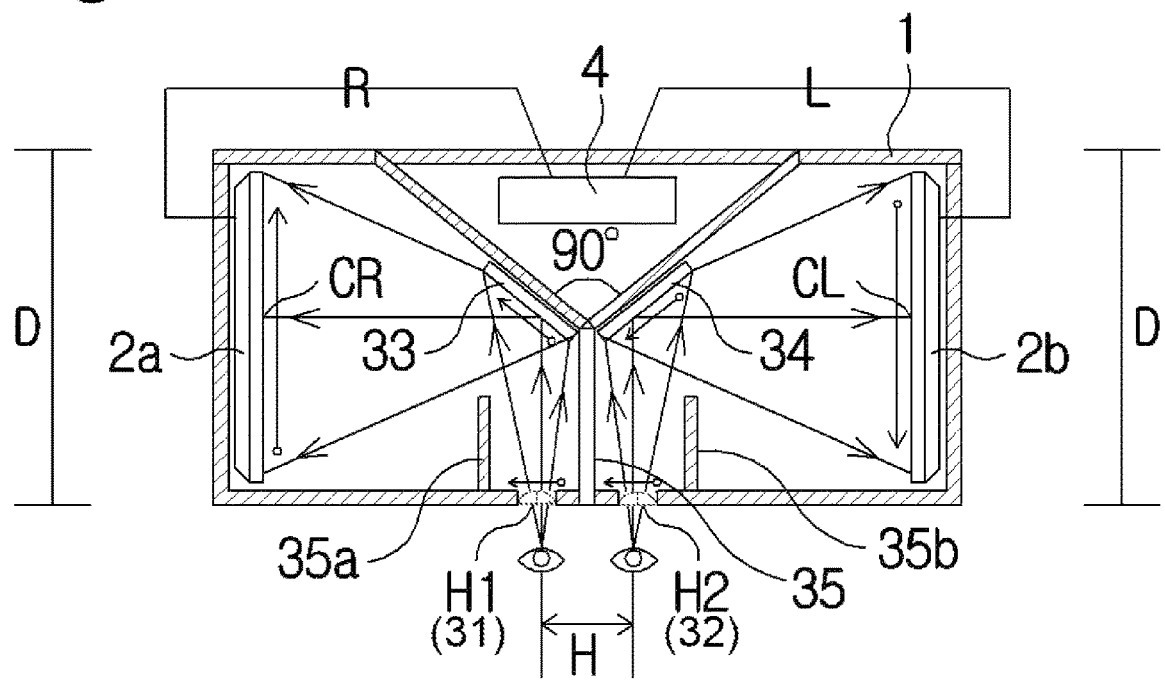
FIG. 1 is a structural explanatory view of a rotary box according to the present invention.

As shown in FIG. 1, the present invention is characterized in that an overall optical system including left and right eye ocular lenses 31 and 32, left and right monitors 2a and 2b, first or second left and right division reflectors 33, 34, 36, and 37, and the like is provided in one rotary box 1. An optical structure in which the optical axis of the large monitor, the optical axis of each reflector, and the optical axes of the left and right ocular lenses such as the left and right eye intervals coincide with each other on one optical axis line is configured in the rotary box 1, and the rotary box 1 itself is configured to one independent rotation unit to rotate up and down, left and right.

The monitor provided in the present invention is characterized by using a general monitor 2 unlike a 3D monitor which is combined with a polarizing film and a translucent mirror and observes stereoscopic images through polarized glasses in the related art. For example, an image display, that implements a common 2D image, such as a planar or curved surface type such as an LCD, an LED, an OLED, a QLED, a micro LED, or a screen type such as a small projector, is applied.

Figure 2:
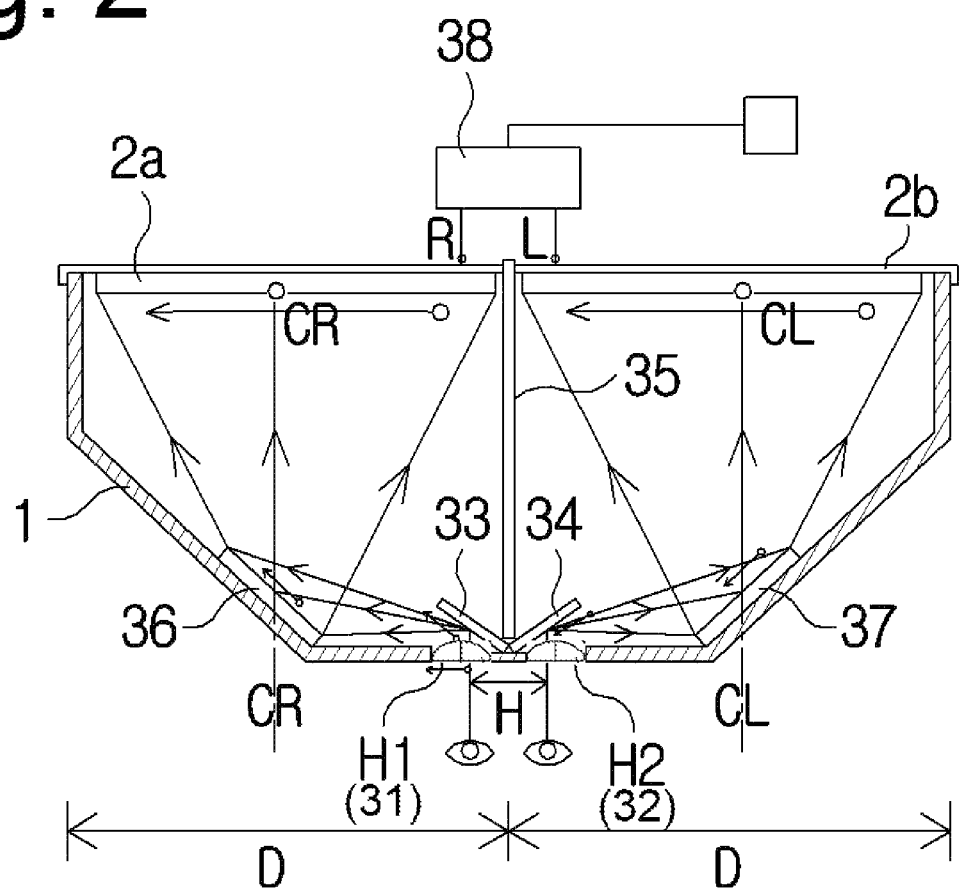
FIG. 2 is an explanatory diagram of an application example 1 of the rotary box.
Figure 3:
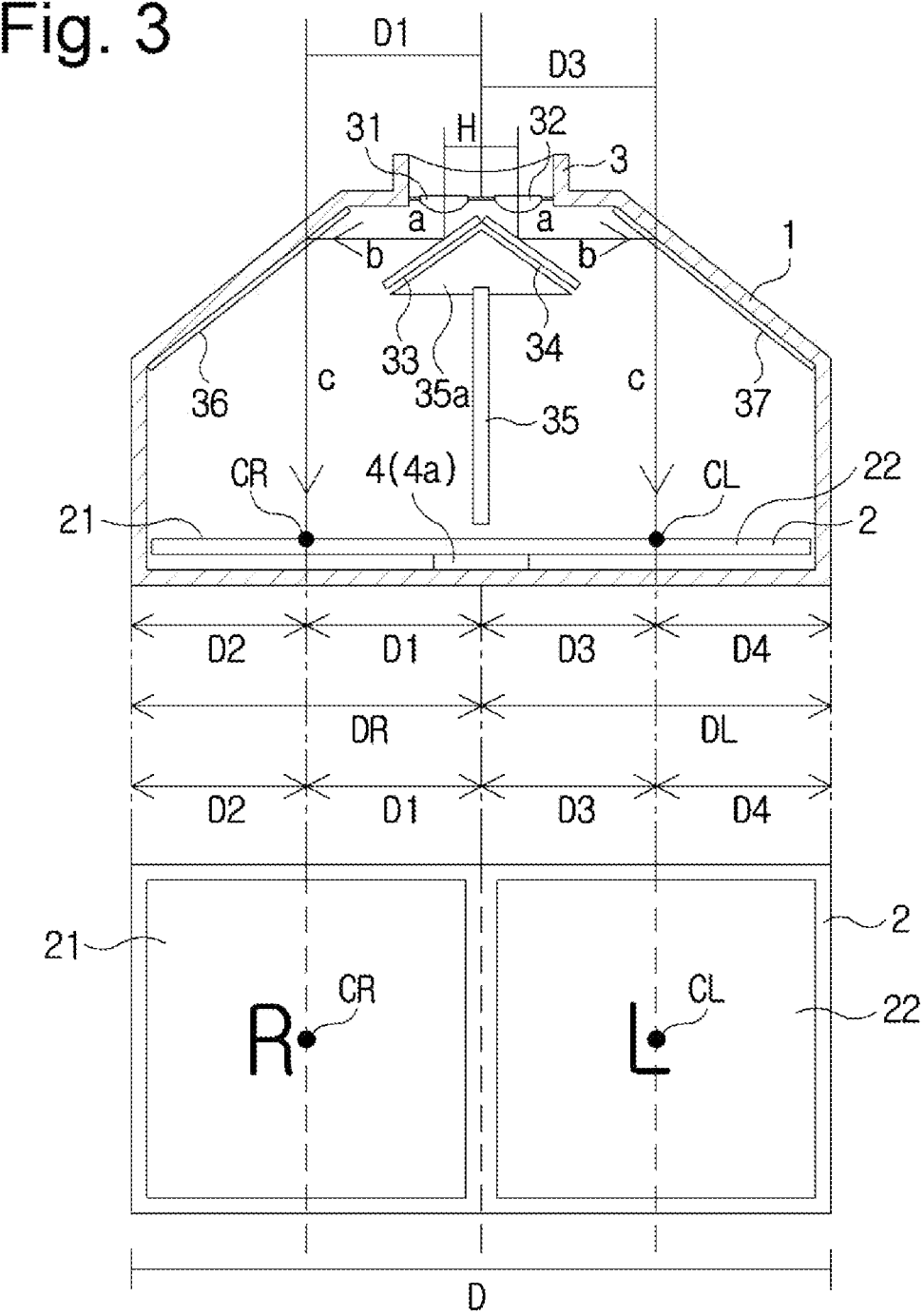
FIG. 3 is an explanatory diagram of an application example 2 of the rotary box.

In the present invention, in two left and right monitors 2a and 2b as shown in FIG. 1 and FIG. 2, one monitor 2 as shown in FIG. 3, and an image surface, left and right stereoscopic images 21 and 22 are edited in one image frame and input and expressed to one or two monitors, respectively.

The reflector used in the present invention refers to a reflector or prism having a reflective surface formed on a front surface or a back surface, and uses a full reflection reflector having a reflectance of 80% or more to 99%, which is not limited thereto.

In the present invention, an optical axis refers to a line connecting the center and a focus of a lens in an arranged optical system.

That is, unless each image component constituted in the rotary box 1 is configured at an optically calculated position and on an optical axis, it is impossible to observe the stereoscopic image.

Therefore, it is important that each optical component is configured to be matched on the optical axis line.

Thus, in the present invention, each optical component means a highly computed optical position and configuration that can achieve the object of the present invention by a position, a square, and a square direction of the optically calculated reflector, a focal length of lens, a reflection distance and a reflection direction of a reflector.

The function of the left and right ocular lenses used in the present invention has different function and structure from those of a magnifying lens which is magnified 5 times to 20 times like ocular lenses used in a conventional microscope or HMD.

That is, the ocular lens is configured as an ocular lens for matching an optical axis for the purpose of matching an optical axis of the image of the left and right monitor refracted through the reflector and the pupil spacing of the human, and the focal distance is configured for matching the optical axis of 100 mm or more to less than 1000 mm.

The magnification of the focal length of 100 mm very slightly acts as 2.5 times of the magnification of 1000 mm, which is 0.4 times less than 1 times of the magnification. However, an optical axis matching action is performed, in which the left and right images are combined to one image by matching the optical axis while maintaining the resolution of the monitor image to be observed.

The left and right ocular lenses 31 and 32 for matching the optical axis are configured in left and right observation holes H1 and H2 of the rotary box 1, respectively. Accordingly, since the positions of the left and right observation holes H1 and H2 and the left and right ocular lenses 31 and 32 are optically the same to be described with the same concept in the present invention.

The present invention relates to a device for a virtual reality image in which a virtual reality image having a viewing angle of 120° to 360° at left and right and 90° to 360° at up and down is inputted and observed while rotating in an image range of a constant viewing range, and thus a combined configuration of a position sensor 4 for detecting the image of the corresponding position in accordance with the up, down, left, and right rotations of the rotation box 1 is important.

The position sensor 4 may be additionally mounted with a gyro sensor for sensing a viewing angle according to the rotation of the rotary box 1, an accelerometer sensor according to a rotational speed, a proximity sensor, a GPS sensor which is mounted on a transportation means such as trains or ships to calculate the position thereof during moving, and a barometer sensor, and added with a WI sensor and an NFC sensor for transmission of stereoscopic image programs. Such a position sensor 4 may be separately configured to be coupled to or spaced apart from the inside of the rotary box 1 or the outside the rotary box 1 as needed.

When a 2D image is provided with the same image, a virtual reality image in which a viewing angle is doubled is provided.

When described in more detail by FIG. 1, two independent monitors, that is, the left monitor 2a and the right monitor 2b, are configured in front and rear directions on both left and right wall surfaces of the rotary box 1 as shown in FIG. 1, respectively, and the screens are configured to symmetrically face each other.

That is, the left monitor 2a is provided on the left side of the rotation box 1 and the right monitor 2b is provided on the right side of the rotation box 1, respectively, but the screens are configured to face each other in the direction of the rotation box 1.

The front and rear lengths of the rotary box 1 have a basic distance due to the basic viewing distance from the left and right observation holes H1 and H2 to the left and right monitors 2a and 2b, and such a basic distance is preferably increased, but the size of the rotary box 1 becomes increased.

Therefore, the structure of FIG. 1 is configured such that the sizes of the left and right monitors 2a and 2b are overlapped in the front and rear viewing directions of the rotary box 1 to reduce the volume of the rotary box 1 up to ½ to ¼.

The positions of the first and second left and right reflectors 33 and 34 are configured at the positions where the positions of optical axes CR and CL of the left and right monitors 2a and 2b and the positions of the optical axes CR and CL of the left and right observation holes H1 and H2 perpendicularly cross each other, and an internal angle configured by a bi-directional square of the first left and right reflectors is 90°.

CR and CL images of the left and right monitors 2a and 2b are provided with a structure of a shielding film 35 and left and right viewing shielding films 35a and 35b as necessary to separate the image units into left and right, respectively. An interval H between the observation holes H1 and H2 is configured to have the same interval as the eye interval of the human and is provided with the left and right ocular lenses 31 and 32.

In such a structure of FIG. 1, the CR and CL images of the left and right monitors 2a and 2b are separated by the structure of the shielding film 35 and the structures of the left and right viewing shielding films 35a and 35b, and then right-reflected to first left and right reflectors 33 and 34 formed in left and right rectangular symmetrical shapes to be reflected in directions of the left and right ocular lenses 31 and 32 of the left and right window holes H1 and H2, and separately input to left and right eyes of the observer. As a result, the image of the CR optical axis is incident on the left eye of the observer and the image of the CL optical axis is incident on the right eye of the observer, respectively.

As shown in FIG. 1, the left eye image provided by the left monitor 2a is provided so that the left and right directions of the image are reversed in the process of perpendicular refraction reflection in the first left reflector 33.

Since a right eye image provided in the right monitor 2b is configured to face the left monitor 2a in a symmetric form, the left and right images are inverted to be right and left images, and the right and left images are reflected to the second right reflector 34 again and changed again to the right and left directions from the right observation hole H2.

At this time, the position of the position sensor 4 is configured at the rear end facing the inner left and right observation holes H1 and H2 of the rotary box 1.

This is because even if the left and right monitors 2a and 2b are configured on the left and right sides, the virtual reality image rotates based on the viewing angle in the front direction observed by the left and right observation holes H1 and H2.

Since a conventional stereoscopic image is a structure that combines two images into one, the screen viewing angle is reduced to ½ to provide a confined viewing angle.

However, since the structure of the present invention is provided at the same interval H between the left and right eyes of the human from the left and right ocular lenses 31 and 32, the viewing angle with respect to the conventional stereoscopic virtual reality is twice or more increased, and as a result, it is possible to appreciate the virtual reality image of 4 times wide viewing.

In addition, since the structure of FIG. 1 is refracted and reflected only once by the first left and right reflectors 33 and 34, the loss of brightness due to the reflector is small and multiple image is reduced, so that the virtual reality image viewing having 8 times definition larger than the polarizer, the translucent mirror, and the polarized glasses structure in the related art.

FIG. 2 shows an example in which left and right monitors 2a and 2b are provided in the left and right parallel to the front surface with respect to the left and right observation holes H1 and H2.

The second left and right reflectors 36 and 37 are additionally provided in the structure of FIG. 1 so that the optical axes CR and CL which are the image centers of the left and right monitors 2a and 2b, the optical axes CR and CL of the second left and right reflectors 36 and 37, the optical axes CR and CL of the first and right reflectors 33 and 34, and the optical axes CR and CL of the left and right ocular lenses 31a and 32a of the left and right observation holes H1 and H2 are equally configured.

As shown in FIG. 2, in such an optical configuration, the image of the left monitor 2a has the second left reflector 36 in a rectangular shape on the same optical axis based on the center CR of the screen, and the image incident to the second left reflector 36 is reflected in a right direction which is an inner direction to be incident to the first left reflector 33 and reflected to the left ocular lens 31 of the left observation hole H1 which is a left viewing direction of the observer again.

The image of the right monitor 2b has the second right reflector 37 in a rectangular shape on the same optical axial line CL based on the center CL of the screen, and the image of the right monitor 2b incident to the second right reflector 37 is reflected in a left direction which is an inner direction to be incident to the first right reflector 34 again and reflected to the right ocular lens 32 of the right observation hole H2 again.

A shielding bar 35 is provided between the first and second left reflectors 33 and 36 and the first and second right reflectors 34 and 37 so that the images of the left and right monitors 2a and 2b are prevented from being viewed to the multiple images, respectively.

As such, an interval H between the left and right optical axes CR and CL incident to the left and right observation holes H1 and H2 is based on about 65 mm which is an interval between the human eyes.

The images of the left and right monitors 2a and 2b of FIG. 2 are matched with the central optical axes CR and CL of the second left and right reflectors 36 and 37, matched with the optical axes CR and CL of the first left and right reflectors 33 and 34 again, and matched with the left and right eye intervals H1 and H2 of the human having a size of 65 mm, which is the left and right eye interval of the human.

That is, even if the size of the left and right monitors 2a and 2b is large, the interval between the optical axes CR and CL of the left and right monitors 2a and 2b and the interval between the optical axes CR and CL of the left and right observation holes H1 and H2 are finally matched with the interval H between the human eyes, so that the size of the screen may be configured as a monitor of 130 mm to 1000 mm based on the horizontal length.

Accordingly, as shown in FIG. 2, the central optical axes CR and CL of the left and right monitors 2a and 2b, which are respectively configured as left and right parallel are incident to the second left and right reflectors 36 and 37, reflected in left and right inner directions, respectively, and refracted and reflected to the left and right eyes of the observer positioned in the left and right observation holes H1 and H2 by the first left and right reflectors 33 and 34 again.

In addition, the structure of FIG. 3 has the same structure as the structure of FIG. 2, but the screen of a single monitor having an aspect ratio of 16:9 is divided into two to be configured as a screen of 8:9×2.

The structure of FIG. 3 includes a first left reflector 33 configured as a 45° square in a left direction to be reflected in an outer direction on the front surface of the left ocular lens 31 and having a reflective refraction angle at a right angle of 90°, a second left reflector 36 configured as a square at 45° to be reflected in a front direction, that is, in-monitor direction on the front surface of the first left reflector 33 and having a refraction angle at a right angle of 90°, a first right reflector 34 configured as a 45° square in a right direction to be reflected in an outer direction on the front surface of the right ocular lens 32 and having a refraction angle at a right angle of 90°, a second right reflector 37 configured as a square at 45° to be reflected in a front direction, that is, monitor 2 direction on the front surface of the first right reflector 34 and having a refraction angle at a right angle of 90°, and one monitor 2 at a focal distance position of the left and right ocular lenses 31 and 32 on the front surfaces of the second left reflector 36 and the second right reflector 37.

The structure of the monitor 2 has a 2D monitor 2 having a screen horizontal length of 130 mm or more and a size of 1000 mm, and the center of the monitor 2 is divided into two to express stereoscopic left image 21 and right image 22 at left and right.

Such an optical structure is configured inside one rotary box 1 so that the whole rotary box 1 rotates in one rotation unit.

The optical structure is configured by combining the position sensor 4 including a gyro sensor provided on one side of the rotary box 1, known upper and lower rotary devices 6 provided at left and right sides of the rotary box 1, and known left and right rotary bars 7 provided below the upper and lower rotary devices 6.

In more detail, as shown in FIGS. 1, 2, and 3, the optical structure is configured by an observation hole 3 having the first left and right reflectors 33 and 34, the second left and right reflectors 36 and 37, and the left and right ocular lenses 31 and 32, a shielding bar 35 for shielding the center of the image, a general 2D monitor 2, a position sensor 4 for detecting an image at a corresponding viewing angle of the virtual reality image, and a computer 4a for calculating the image position detected by the position sensor 4. The constituent elements are all constituted by a unit of rotation in one rotation box 1 and configured by an independent rotary box 1 capable of simultaneously rotating in up, down, left and right directions.

The distance intervals between the left and right ocular lenses 31 and 32, the first and second left and right reflectors 33, 34, 36, and 37, and the monitor 2 or the left and right monitors 2a and 2b, and the distance interval between the focal distances F of the left and right ocular lenses 31 and 32 and the monitor 2 are the same as each other or within ±10%.

This is because the depth of focus may vary depending on a difference of the human vision, but the difference is within 10%.

The function of the left and right ocular lenses 31 and 32 used in the present invention is different from that of a conventional magnifying lens having a magnifying function.

The left and right ocular lenses 31 and 32 used in the present invention have a focal length of 100 mm or more and less than 1000 mm.

A short lens with a focal length of less than 100 mm disintegrates the resolution of the monitor image by the enlarged magnification, so the resolution is reduced by the enlarged magnification and due to the refractive index, the resolution of the monitor is deteriorated and simultaneously, dizziness is caused.

On the other hand, when the ocular lens is used as an ocular lens having a focal length of 1000 mm or more, it is difficult to observe the stereoscopic image because an effect of matching the optical axes of the stereoscopic left and right images with the optical axes of the left and right eyes of the observer is slight.

In addition, since a projection distance from the images of the left and right monitors to the first left and right reflectors or the first and second left and right reflectors is increased, the size of the rotary box 1 is enlarged and becomes difficult to use.

For this reason, in the present invention, an ocular lens for matching an optical axis having a focal length of 100 mm or more and less than 1000 mm is constituted.

Further, the left and right ocular lenses 31 and 32 are subject to distortion to increase dizziness. In order to eliminate such side effects, the optical configuration of the ocular lens is required.

That is, as shown in FIG. 3, a distance between the left and right observation lenses 31 and 32 and the first left and right reflectors 31 and 32 is represented by a, a distance between the first left and right reflectors 31 and 32 and the second left and right reflectors 36 and 37 is represented by b, and a distance between a reflective center of the second left and right reflectors 36 and 37 and the left and right centers CR and CL of the monitor 2 is represented by c, the focal length F of each of the left and right ocular lenses 31 and 32 and the focal distance F of the left and right ocular lenses 31a and 32a need to be equal to or less than a+b+c.

That is, F≥a+b+c.

As shown in FIG. 3, since a normal aspect ratio of the monitor 2 is 16:9 of width:length, the image is divided into two at a aspect ratio of 8:9 based on the central optical axis of the monitor 2 to constitute the left image 21 and the right image 22. The central positions CR and CL of the left image 21 and the right image 22 and the central positions of the second left and right reflectors 36 and 37 and the first left and right reflectors 33 and 34 are matched with the central optical axes CR and CL of the left and right ocular lenses 31 and 32.

The reason is that the central axes CR and CL of the first left and right reflectors 33 and 34, the second left and right reflectors 36 and 37, and the left and right screens of the monitor 2 are matched with the left and right ocular lenses 31 and 32.

The central axes CR and CL and the optical axes CR and CL of the image described in the present invention are the same concept.

That is, for this reason, as shown in FIG. 3, D1, D2, D3, and D4 are all configured equally, and the total length D of the monitor D is D=D1+D2+D3+D4.

That is, when F≥a+b+c, the DR and DL are the same, and the D1, D2, D3, and D4 are all the same as each other, the left and right ocular lenses 32 are matched with the centers CR and CL of the left and right images L and R of the monitor 2 to be duplicatedly observed as one image, and the left and right images R and L of the monitor 2 at a distance of a+b+c are matched with the focal length F of the left and right ocular lenses 31 and 32, thereby making it possible to observe the stereoscopic image without the polarizing plate, the polarizing glasses, and the translucent mirror.

If the size of the monitor 2 is equipped with a buffer device for buffering the weight of the rotary box 1, the screen size may be applied to a 40-inch monitor 2 having a diagonal of about 1,166 mm with a width of 1,000 mm and an aspect ratio of 16:9.

Particularly, such an optical structure may be configured by using optical specifications of left and right images, that is, F≥a+b+c, and thus two left and right images are enlarged with the same size to be combined as one image, thereby observing the stereoscopic image.

In the case of the 2D image, the field of view is doubled.

≥ means the same or greater than.

Generally, it has been pointed out that causing the dizziness and myopia due to the characteristics of the virtual reality images having a large number of movement in the up, down, left, and right directions is a problem.

Therefore, the configuration of the left and right ocular lenses 31 and 32 is configured as follows, as shown in FIGS. 4A, 4B, 4C, 4D, 4E, and 4F, thereby observing a high-definition image.

Figure 4A:
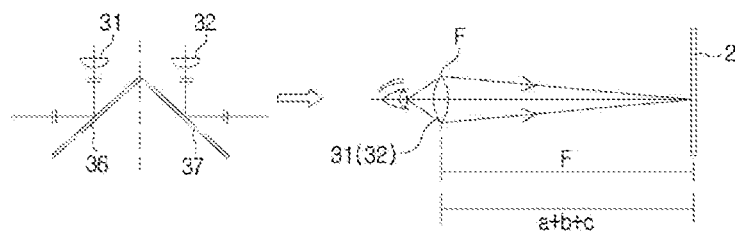
FIG. 4A is a configuration example for an achromatic lens of left and right observation lenses.

As shown in FIG. 4A, the configuration of the left and right ocular lenses 31 and 32 is configured as ocular lenses in which so-called chromatic aberration is removed by synthesizing two lens glasses having different refractive characteristics of lens materials as one lens.

For example, crown glass with a refractive index of 1.5 and flint glass with a refractive index of 1.617 have relatively different refractive indexes based on a yellow line.

Therefore, when two different materials are configured by one lens with − curvature and one lens with + curvature and becomes an achromatic lens in which the chromatic aberration is removed when synthesized with one lens.

The ocular lens having such a remarkably reduced chromatic aberration makes it possible to observe clear color images.

The same logic is applied to attempting to being configured by plastic or a combination of plastic and glassware.

However, the focal length F of the left and right ocular lenses 31 and 32 in which the two lenses are combined needs to be F≥a+b+c.

In addition, the focal lengths F of the left and right ocular lenses 31 and 32 needs to be the same as each other at the left and right.

That is, when the focal lengths F of the left and right ocular lenses 31 and 32 are different from each other, the enlargement magnification is changed and the left and right images are not combined, and thus actually, stereoscopic observation is impossible.

Figure 4B:
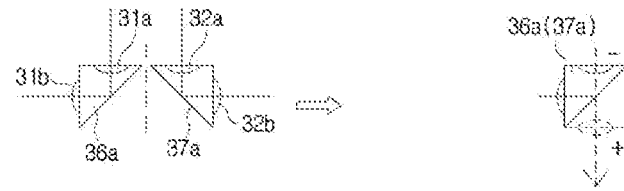
FIG. 4B is a configuration example 1 of a prism, an image objective lens, and an ocular lens.

As shown in FIG. 4B, the first left and right reflectors 36a and 37a are constituted by prisms, has each concave lens having a negative force constituted on the incident surface, has a convex lens having a positive force constituted on an emission surface, and locks close to 1.01 to 2 times by the focal length of the ±curvature.

In this case, since the matching effect of the optical axes CR and CL occurs, the stereoscopic image may be observed because the left and right images of the monitor 2 are combined with each other.

Figure 4C:
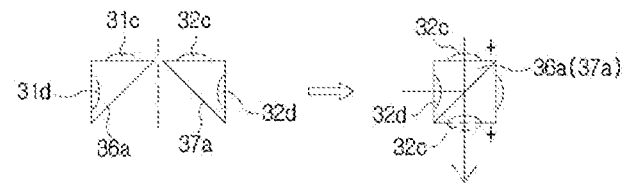
FIG. 4C is a configuration example 2 of a prism, an image objective lens, and an ocular lens.

FIG. 4C has the same logic as that of FIG. 4B except that only the constituent positions of the concave lens and the convex lens are changed.

Figure 4D:
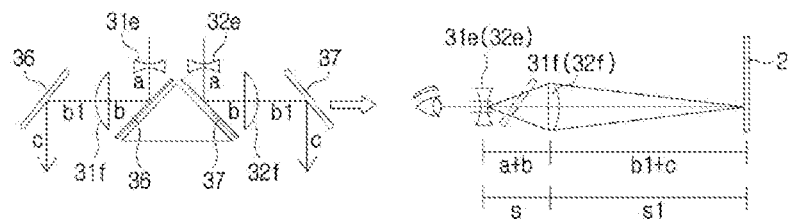
FIG. 4D is a configuration example 3 of a prism, an image objective lens, and an ocular lens.

In FIG. 4D, the left and right ocular lenses 31e and 32e are constituted by a concave lens having a negative force, the first left and right reflectors 36 and 37 are constituted by a material of a reflector or a right angle prism, and the image objective lenses 31f and 32f are constituted by convex lenses having a positive force on the front surface thereof.

This configuration causes the focal length F of the image objective lenses 31f and 32f having a positive force to be b1+c.

Through such a configuration, when the focal length of the image objective lenses 31f and 32f is 20 mm and the focal length of the left and right ocular lenses 31 and 32 is 10 mm based on + or −, the near-field effect having a telescope function becomes the viewing distance effect which is close to 2 times.

That is, the observer is able to match the optical axes of the left and right images while functioning as the image viewing effect at a two times short distance of the left and right images of the monitor 2 at a remote place through the left and right ocular lenses 31 and 32.

Figure 4E:
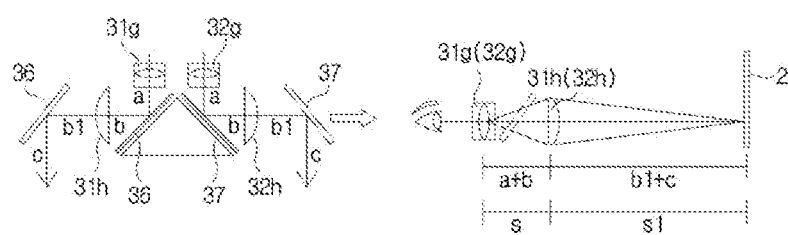
FIG. 4E is a configuration example 4 of a prism, an image objective lens, and an ocular lens.

In FIG. 4E, the logic as shown in FIG. 4E, or the configuration of the image objective lenses 31f and 32f is constituted by a + lens having a positive force.

In this case, the sum of the focal lengths of the ocular lens and the image objective lens is + magnification.

That is, if the focal distance F of the image objective lens is 500 mm and the focal length F of the ocular lens is +250 mm, the image is observed at a closer distance of two times or more. However, in this case, since the image is shown as an inverted image, the image of the monitor 2 is turned upside down.

Figure 4F:
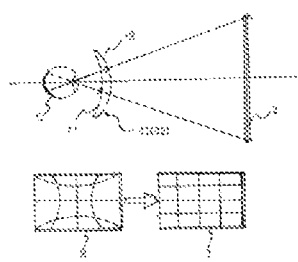
FIG. 4F is an example 5 of a distortion-free objective lens shape.

In FIG. 4F, the above-described logic, or the configuration of the left and right ocular lenses 31 and 32 is formed in a concave shape of a first spherical surface r1 which is an inner surface of the lens surface as a human pupil position direction, a second spherical surface r2, which is the outer surface of the lens surface, is formed in a + convex shape, and the sum of the focal lengths of the first and second spherical surfaces has a positive force.

An example of this will be described as follows.

The human eyeball, that is, the pupil 33 is formed in a ball shape.

The formula for obtaining the focal length F of the lens is as follows.

$$F=(ND-1)(1/r1)+(1/r2)\ (ND=\text{refractive index of lens material}).$$

The left and right ocular lenses 31 and 32 are made of a material having a refractive index of 1.5, and r1 is a spherical surface having a distance slightly spaced from the pupil based on the center axis c of the radius of curvature of the pupil 33 as shown in FIG. 4F, that is, a 65 mm position at a distance of about 15 mm when it is assumed that the size of the human eyeball is 50 mmR.

When r2 is formed as +65R, the focal length F calculated by the above formula becomes 455 mm.

For example, when a lens having a focal length of F=455 mm is prepared on the basis of this criterion, F=455 mm when ND=1.50, r1=−70, and r2=+65 by the above lens manufacturing formula.

Since such a configuration of the ocular lens of FIG. 4F is so enlarged in the viewing angle of the spherical surface of the human pupil, the image of the monitor 2 is not distorted to provide a natural image, thereby viewing a clear image which is not fatigue by removing a dizziness.

These ocular lenses 31 and 32 may be applied to all of the examples of the ocular lenses.

As described above, according to the present invention, the focal length F of the left and right ocular lenses 31 and 32 and the distances between the left and right ocular lenses 31 and 32 and the monitor 2 are matched with each other or configured within the depth of focus, and the left and right images are separately observed by left and right eyes with the left and right ocular lenses 31 and 32, respectively, so that stereoscopic images may be observed.

As described above, the structures of FIGS. 4A, 4B, 4C, 4D, 4E, and 4F are applied to the same logic as the structures of FIGS. 1, 2 and 3.

In the optical system of FIGS. 1, 2, and 3, the shielding bar 35 is provided between the left and right images 21 and 22, and between the first left and right reflectors 33 and 34, and the second left and right reflectors, and the left and right ocular lenses 31 and 32 so as not to overlap the left and right images.

Accordingly, in the present invention, one rotary body 1 configured by the general monitor 2 or each of independent left and right monitors 2a and 2b, the first left and right reflectors 33 and 34, the second left and right reflectors 36 and 37, the position sensor 4 including a gyro sensor, and the computer 4a for the calculation of the position sensor 4 and receiving the image is combined with the known left and right rotary means, and combined with upper and lower rotating means again.

Figure 5:
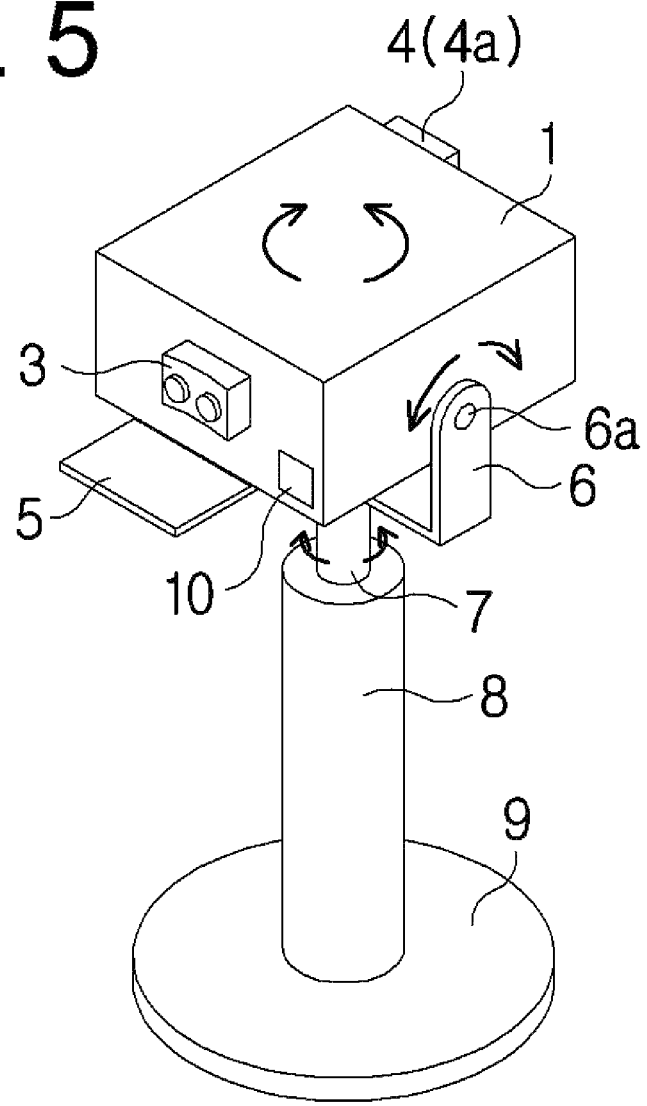
FIG. 5 is an explanatory diagram showing a state in which the rotary box is combined with upper, lower, left, and right rotary means in the related art.
Figure 6:
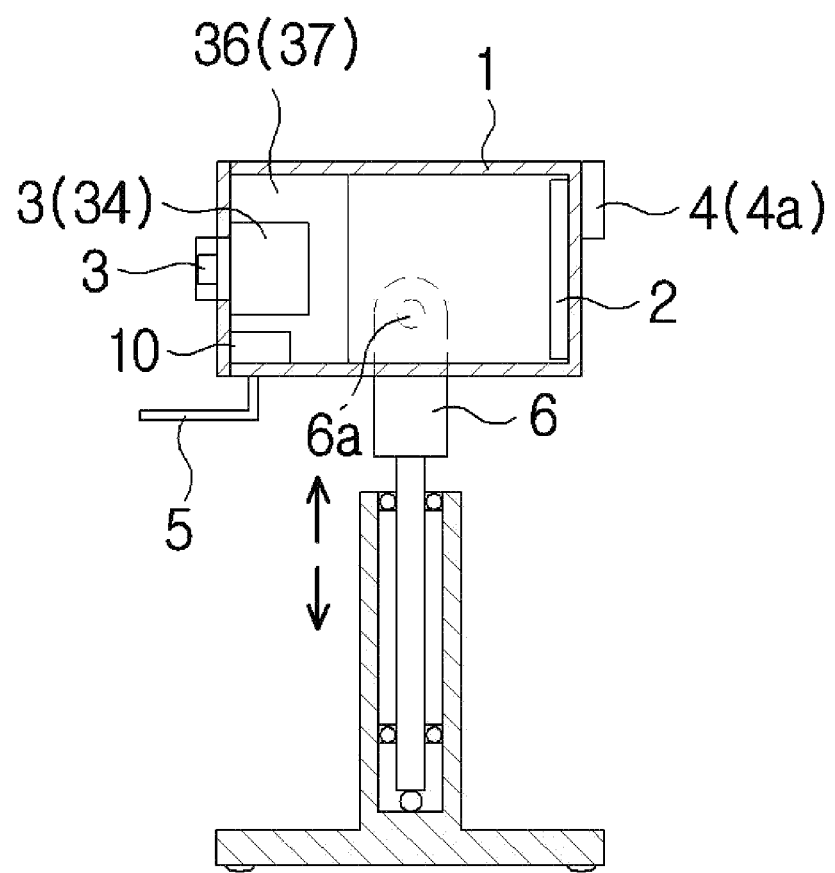
FIG. 6 is an explanatory diagram showing a cross-sectional view of FIG. 5.

As shown in FIGS. 5 and 6, the present invention is not limited to both of the left and right sides of the rotary box 1, but the rotary box 1 is coupled to the upper and lower rotary bars 6 capable of rotating at 45° or more to 300° at up and down and known left and right rotary bars 7 capable of rotating at 100° or more to 360° at left and right.

The up, down, left and right rotation ranges are not limited.

In this case, the user rotates the rotary box 1 receiving the stereoscopic left and right eye images L and R or the 2D edited virtual reality image in one image frame from the small computer 4a at up, down, left and right by the upper and lower rotary bars 6 and the left and right rotary bars 7 to detect and provide the image by calculating the rotated image in the corresponding viewing direction by the position sensor 4.

The configuration of the position sensor 4 may have a structure for sensing the rotary box 1 moving at the rear surface of the monitor 2 or a fixed position separated from the rotary box 1.

In addition, when the position sensor 4 is used as a camera sensor, the camera sensor is separately provided on the rear side of the rotary box 1 based on the user, and a response sensor responsive to the camera sensor is coupled to a rear end of the rotary box 1.

The sensing reference of the position sensor 4 is calculated based on the position of the front screen observed by the user as a reference, and the moving position while rotating when the rotary box 1 rotates up, down, left, or right is calculated.

Such a reference is equally applied to all of the above embodiments of the present invention.

Therefore, according to the present invention, since a large screen of 6 to 40 inches may be provided on the optical axis of the ocular lens as compared with a conventional 3-inch screen as the size of the general monitor 2, it is possible to provide a 4 to 230 times 2D or 3D virtual reality image, simultaneously rotate the overall optical components by a unit of the rotary box 1, and contribute to reduction in weight of the rotary box 1 compared with the related art.

What is claimed is:

1. A high-definition virtual reality image system, provided inside a rotary box that includes left and right ocular lenses provided on a front end of the rotary box, the left and right ocular lenses being spaced apart to approximate a distance between a viewer's pupils, and upper and lower rotation means and left and right rotation means coupled to the rotary box to rotate the rotary box up, down, left and right, the system comprising:
   a left monitor and a right monitor disposed horizontally on a rear end of the rotary box to provide a 3D left image and a 3D right image, the left and right monitors each comprising a screen having a screen width of 130 to 1,000 mm;
   a position sensor including a gyro sensor which is disposed on a rear end of the left and right monitors to detect a virtual reality image in a direction in which the rotation box rotates and to input the detected virtual reality image to the left monitor 2a and right monitor 2b;
   a first left reflector and a first right reflector, provided respectively on front ends of the left and right ocular lenses to reflect at right angles in left and right directions respectively;
   a second left reflector and a second right reflector, provided in a reflection direction of the first left reflector and the first right reflector respectively to reflect light at right angles in the directions of the left monitor and the right monitor respectively;
   wherein the first and second reflectors are provided on an optical axis line on which a center of the left image 21 of the left monitor 2a, a center of the second left reflector, a center of the first left reflector, and a center of the left ocular lens coincide, and on an optical axis line on which a center of the right image of the right monitor, the center of the second right reflector, the center of the first right reflector, and the center of the right ocular lens coincide;
   whereby the 3D left image provided by the left monitor is incident on the viewer's left eye through the second left reflector 36, the first left reflector 33 and the left ocular lens 31, and the 3D right image provided by the right monitor 2b is incident on the observer's right eye through the second right reflector, the first right reflector and the right ocular lens, thereby providing a large 3D virtual reality image to the viewer.

2. The high-definition virtual reality image system of claim 1, wherein the left and right monitors are defined by one monitor which is divided into the left and right screens.

* * * * *